US009321419B2

(12) United States Patent
Kwasnik et al.

(10) Patent No.: US 9,321,419 B2
(45) Date of Patent: Apr. 26, 2016

(54) SEAMLESS INSTRUMENT PANEL PASSENGER AIR BAG DOOR

(71) Applicant: Ford Global Technologies, LLC, Dearborn, MI (US)

(72) Inventors: Kenneth J. Kwasnik, Shelby Township, MI (US); Lisandro Trevino, Ann Arbor, MI (US); Sean Bayle West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 14/488,760

(22) Filed: Sep. 17, 2014

(65) Prior Publication Data

US 2016/0075301 A1    Mar. 17, 2016

(51) Int. Cl.
*B60R 21/20* (2011.01)
*B60R 21/2165* (2011.01)
*B60R 21/205* (2011.01)
*B60R 21/215* (2011.01)

(52) U.S. Cl.
CPC ........... *B60R 21/2165* (2013.01); *B60R 21/205* (2013.01); *B60R 2021/21537* (2013.01)

(58) Field of Classification Search
CPC .............. B60R 21/2165; B60R 21/205; B60R 2021/21537

USPC ....................................................... 280/728.3
See application file for complete search history.

(56) References Cited

U.S. PATENT DOCUMENTS

| 5,154,444 | A | 10/1992 | Nelson |
| 5,342,088 | A | 8/1994 | Bauer |
| 5,901,976 | A * | 5/1999 | Kreuzer et al. ............ 280/728.3 |
| 6,494,481 | B2 | 12/2002 | Yasuda |
| 6,550,803 | B1 | 4/2003 | Derrick |
| 7,007,970 | B2 * | 3/2006 | Yasuda et al. .............. 280/728.3 |
| 7,156,414 | B2 | 1/2007 | Hayashi et al. |
| 7,594,674 | B1 * | 9/2009 | Biondo et al. ............. 280/728.3 |
| 7,887,087 | B2 * | 2/2011 | Mazzocchi et al. ........ 280/728.3 |
| 7,967,329 | B2 | 6/2011 | Daita et al. |
| 7,988,184 | B2 | 8/2011 | Fukawatase et al. |
| 8,944,460 | B2 * | 2/2015 | Mazzocchi ................. 280/728.3 |
| 2007/0052211 | A1 * | 3/2007 | Hayashi ..................... 280/728.3 |
| 2008/0136145 | A1 * | 6/2008 | Kong ......................... 280/728.3 |
| 2012/0018985 | A1 | 1/2012 | Bruzzone |
| 2012/0074674 | A1 * | 3/2012 | Ohoka et al. ............... 280/728.3 |
| 2014/0062891 | A1 * | 3/2014 | Powell ......................... 345/173 |

* cited by examiner

*Primary Examiner* — Faye M Fleming
(74) *Attorney, Agent, or Firm* — Vichit Chea; Price Heneveld LLP

(57) ABSTRACT

An air bag housing includes a chute defining an upper perimeter with a first wall extending from the upper perimeter and a cover extending over the chute integrally from the upper edge. The cover defines a tear seam extending between opposite portions of the upper perimeter remote from the first wall and a hinge area extending between the opposite portions of the upper perimeter and disposed between the first wall and the tear seam.

16 Claims, 6 Drawing Sheets

SEAMLESS INSTRUMENT PANEL PASSENGER AIR BAG DOOR

FIELD OF THE INVENTION

The present invention generally relates to an air bag housing structure. Specifically, the housing structure includes features for controlled deflection of an air bag during deployment therefrom.

BACKGROUND OF THE INVENTION

Automotive air bag systems include an air bag module mounted within a housing that is concealed beneath a surface of the vehicle interior. In particular, passenger air bag systems may include a chute defined by the housing and extending within the instrument panel of the associated vehicle. The chute may be concealed beneath a surface of the instrument panel, or outer substrate thereof. In such an arrangement, the outermost layer of the instrument panel extends over an opening to the air bag chute and is supported by a door panel that is movably coupled with a portion of the housing, which may include a wall of the chute. The adjacent portion of the instrument panel or outer substrate thereof includes a pre-weakened tear line that ruptures upon air bag deployment, allowing the air bag to deploy within the chute, out of the opening thereof, and from out of the instrument panel. The door panel provides support for the instrument panel substrate and is typically hingedly coupled with the chute so as to rotate during air bag deployment such that the portion of the instrument panel substrate over the door opens away from the deploying air bag in a generally predetermined movement without impeding the deployment path of the air bag.

Previous housings have included a hinge that is integrally formed with both the chute or other adjacent structure and the door panel. Housings having such hinges are often made from a plastic material exhibiting some degree of flexibility such that the hinge may provide the desired opening motion by bending or flexing. Some hinges of this type have been developed to provide the general ability to bend or flex through a desired opening motion of the associated door. Such flexing may be generally configured to provide maximum movement of the associated door so as to allow the air bag to deploy with minimum impediment thereto. However, air bags incorporated into instrument panels of certain designs may make deflection or other interference with a deploying air bag desirable. Accordingly, further modification may be desirable.

SUMMARY OF THE INVENTION

According to one aspect of the present invention, an air bag housing includes a chute defining an upper perimeter with a first wall extending from the upper perimeter and a cover extending over the chute integrally from the upper edge. The cover defines a tear seam extending between opposite portions of the upper perimeter remote from the first wall and a hinge area extending between the opposite portions of the upper perimeter and disposed between the first wall and the tear seam.

According to another aspect of the present invention, a vehicle instrument panel includes a substrate extending along a plane and defining an interior and an exterior and an air bag housing. The air bag housing includes a chute defining an upper perimeter with a first wall extending therefrom and a cover extending between the interior of the substrate and the upper perimeter of the chute. The cover defines a hinge area extending between opposite portions of the upper perimeter and disposed away from first wall.

According to another aspect of the present invention, an air bag housing includes a chute defining an interior and a cover extending integrally with the chute over the interior. The cover defines a tear seam including first, second, third, and fourth segments dividing the cover into a first forward section, and second and third lateral rearward sections. The cover further defines a hinge area by a reduced material thickness along at least a portion of the cover and extending through the first section.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
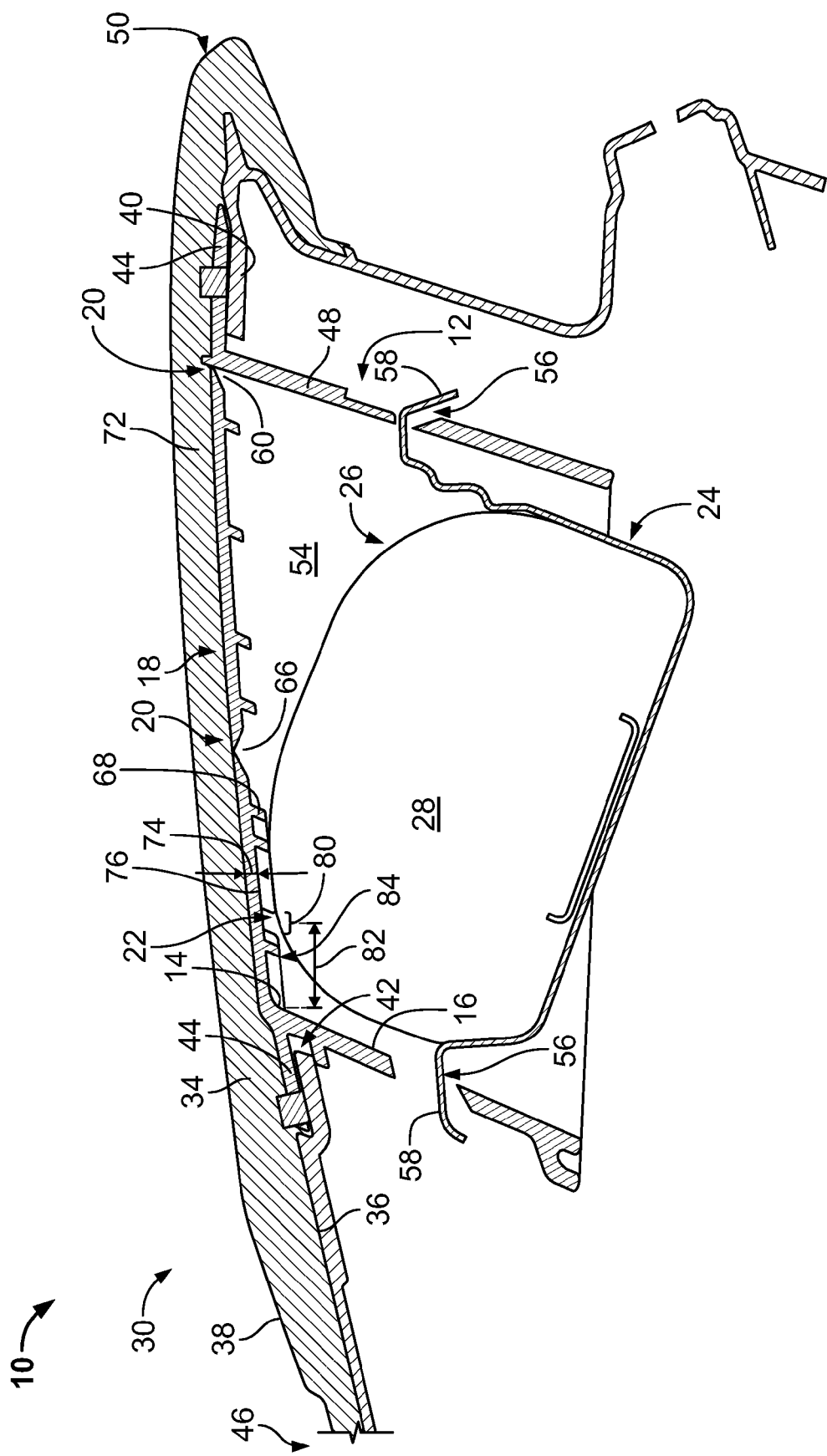
FIG. 1 is a cross-sectional view of an instrument panel including an air bag assembly with a housing, the cross-section taken at plane A in FIG. 2.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates an air bag housing. Air bag housing 10 includes a chute 12 defining an upper perimeter 14 with a first wall 16 extending from the upper perimeter 14. A cover extends over the chute 12 integrally from the upper perimeter 14. Cover 18 defines a tear seam 20 extending between opposite portions of the upper perimeter 14 remote from the first wall 16. The cover 18 further defines a hinge area 22 extending between the opposite portions of the upper perimeter 14 and disposed between the first wall 16 and the tear seam 20.

Figure 2:
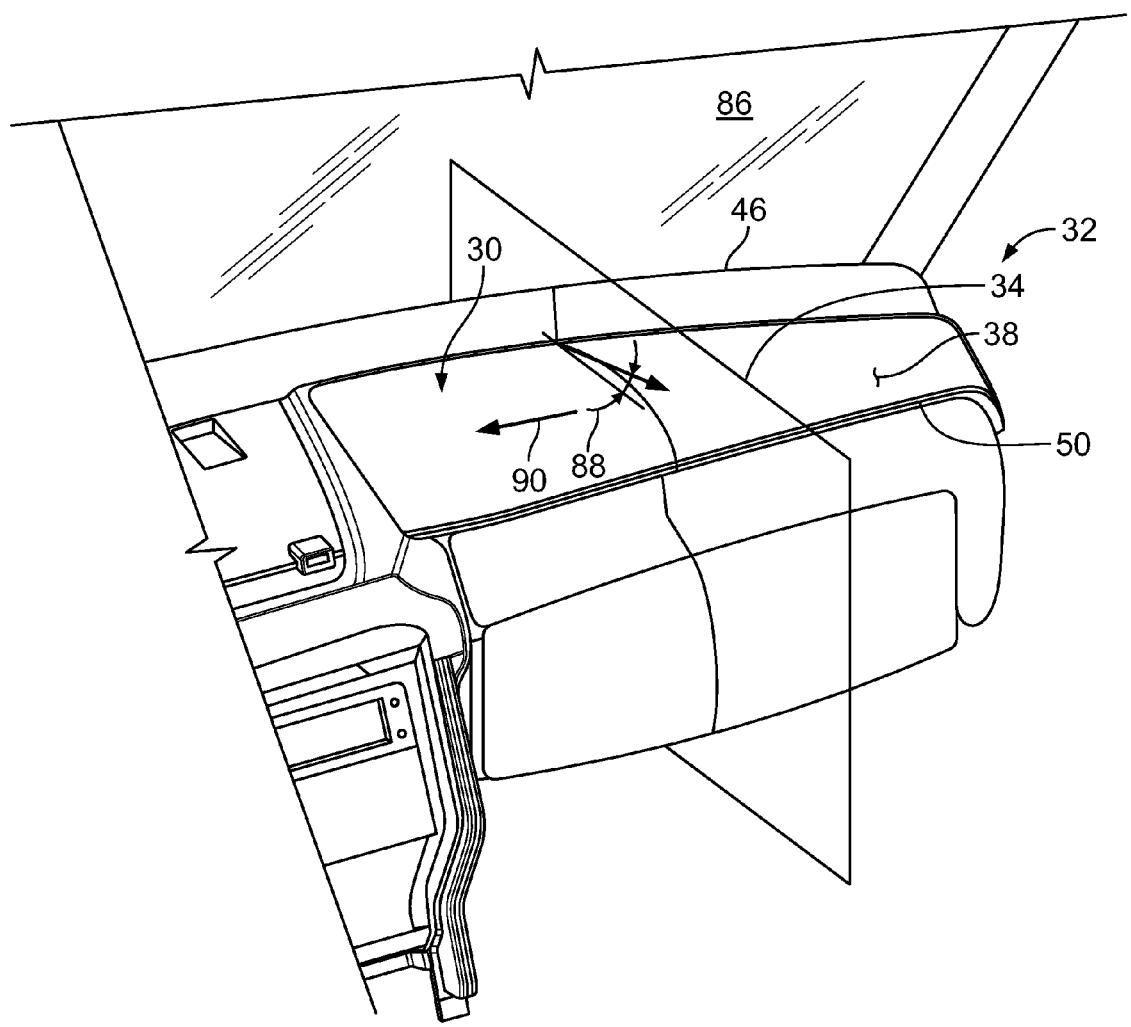
FIG. 2 is a perspective view of a portion of an interior of a vehicle including the instrument panel of FIG. 1.
Figure 3:
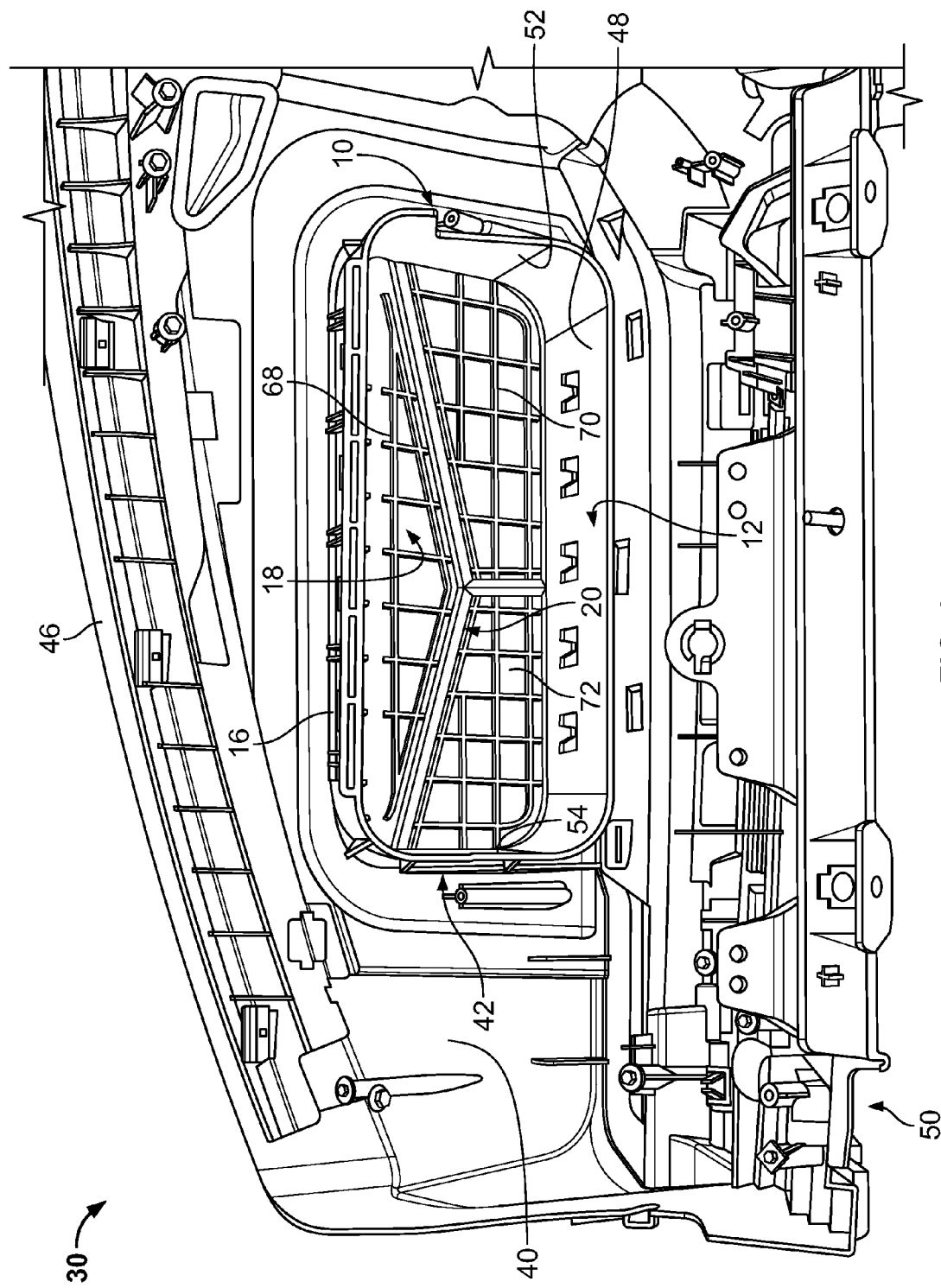
FIG. 3 is an interior view of the instrument panel of FIG. 1 showing an air bag housing assembled therewith.
Figure 4:
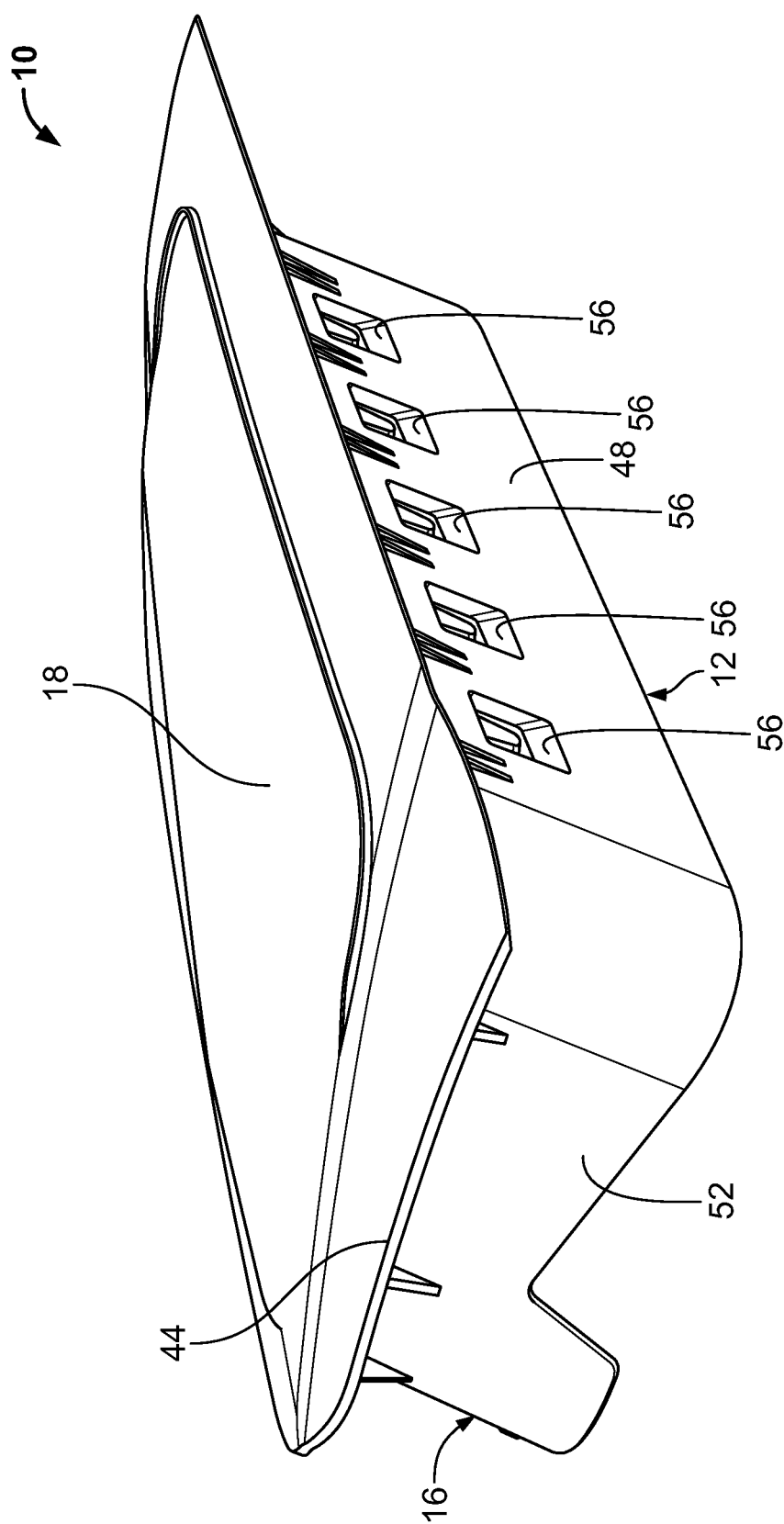
FIG. 4 is a perspective view of the air bag housing of FIG. 3.

As further shown in FIG. 1, an air bag module 24 can be coupled within chute 12 along the interior 26 thereof. Air bag module 24 can have an air bag 28 included therein and configured for deployment from out of air bag housing 10, as further described below. Accordingly, air bag housing 10 can be used for mounting air bag module 24 within an instrument panel 30 within a vehicle 32, an interior view of which is shown in FIG. 2. As shown in FIGS. 1 and 2, instrument panel 30 includes a substrate 34 that extends over instrument panel 30 to provide a finished appearance therefor within the interior of vehicle 32. Substrate 34 is positioned such that an exterior surface thereof 38 is positioned toward the interior of vehicle 32 and an interior surface 36 thereof faces towards and contacts with adjacent portions of instrument panel 30 (including structural frame 40). As shown in FIGS. 1 and 3, air bag housing 10 is coupled with instrument panel structural frame 40 such that chute 12 extends within an opening 42 therein. As such, cover 18 of air bag housing 10 extends over opening 42 to contact and give support for substrate 34 in the area of opening 42. Accordingly, the shape of cover 18, as well as portions of flange 44 that extend outwardly therefrom (as shown in FIG. 4) can substantially correspond to the shape of the substrate 34 of instrument panel 30. Although substrate 34 may take on a slightly curved configuration, as shown in FIG. 2, for purposes of this discussion, it will be referred to as a generally planar configuration. As such, cover 18 of air bag housing 10, as well as flange 44, are considered to be generally coplanar with substrate 34.

As mentioned above, chute 12 of air bag housing 10 includes a first wall 16, which, as shown in FIG. 1, can be disposed toward a forward edge 46 of instrument panel 30 and can extend away from the perimeter 14 of chute 12 in a direction away from cover 18. In addition to first wall 16, chute 12 can include a second wall 48 disposed toward a rearward edge 50 of instrument panel 30 on an opposite side of cover 18 from first wall 16. Additionally, a third wall 52 can extend along a side of chute 12 between first wall 16 and second wall 48, and a fourth wall 54 can extend along a side of chute 12 opposite third wall 52 between first wall 16 and second wall 48. The plurality of walls 16, 48, 52, and 54 together define interior 26 of chute 12 and further define respective portions of the upper perimeter 14 of chute 12 at or near an intersection thereof with cover 18. In an example, the first 16 and second 48 walls of chute 12 may each contain a plurality of apertures 56 for engagement with a corresponding number of attachment hooks 58 extending from air bag module 24 for mounting air bag module 24 within housing 10. In this arrangement, air bag housing 10 can mount air bag module 24 within instrument panel 30 of vehicle 32 in a manner such that presence thereof is concealed from within the interior of vehicle 32 until deployment of air bag 28, as described further below.

Figure 5:
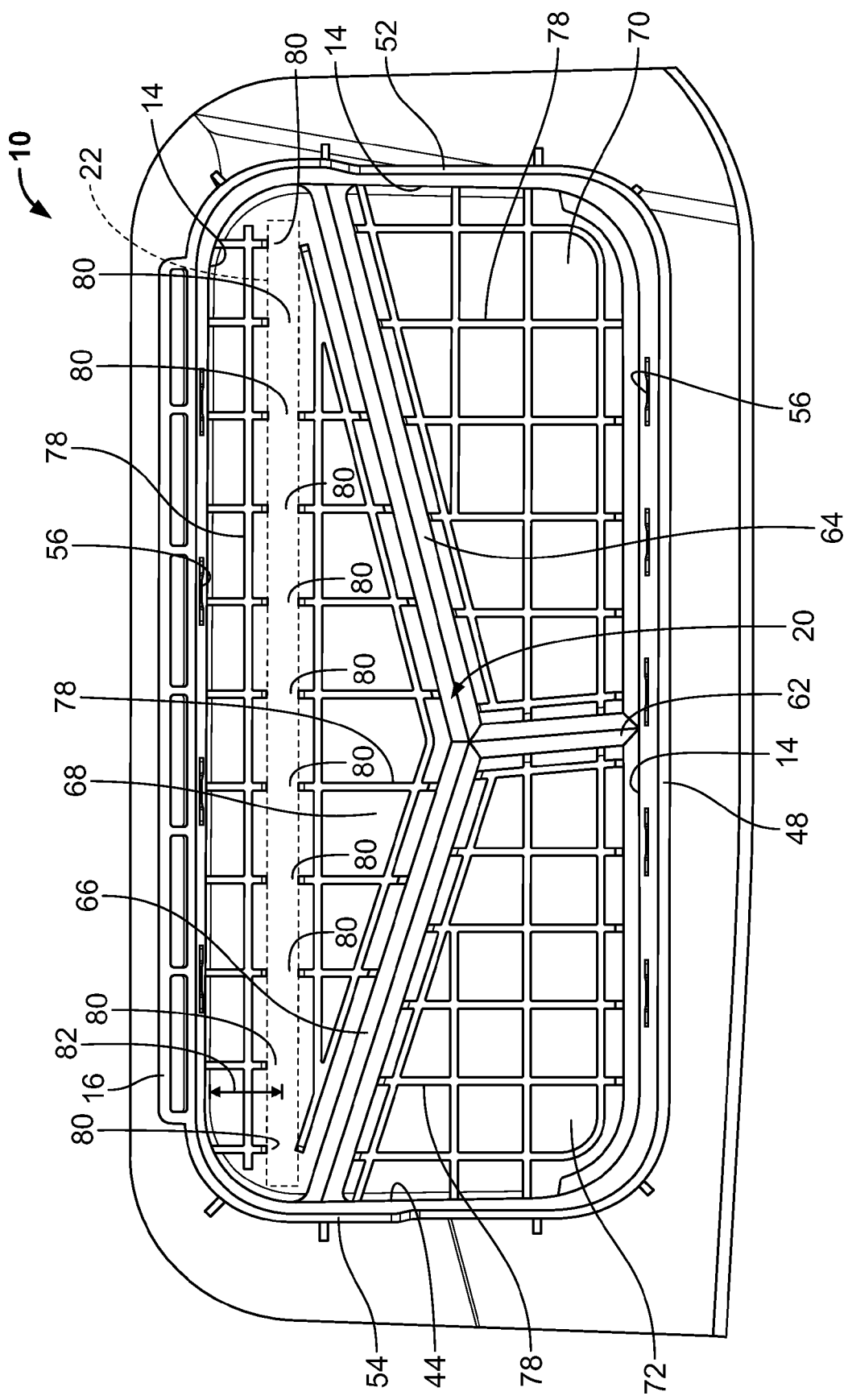
FIG. 5 is a bottom plan view of the air bag housing.

As shown in FIGS. 4 and 5, air bag housing 10, including chute 12 and cover 18 can be formed in a unitary arrangement such that in an initial state (i.e. prior to deployment of air bag 28) air bag housing 10 is in a fully-sealed arrangement wherein cover 18 integrally joins with chute 12 around the entirety of upper perimeter 14. Accordingly, air bag housing 10 can be structured such that cover 18 becomes at least partially unsealed from chute 12 during deployment of air bag 28. In general, such features include a hinge area 22 and tear seam 20, as mentioned above. In particular, tear seam 20 can be in the form of a weakened or thinned area of air bag housing 10 and can be achieved by an abrupt thinning of the material comprising air bag housing 10, as shown in FIG. 1. Tear seam 20 can be configured such that housing 10 rips along tear seam 20 upon deployment of air bag 28 and can further be configured to extend along a generally narrow line, such that the tearing of housing 10 occurs along a well-defined area. Such a structure allows for the rupture of cover 18 along tear seam 20 to further result in the ripping of substrate 34 along the area thereof to allow air bag 28 to extend outwardly therefrom, as described further below.

As shown in FIG. 3, tear seam 20 can include a plurality of segments including a first segment 60 disposed toward second wall 48 of chute 12, and generally positioned adjacent perimeter 14 of chute 12 so as to extend along substantially the width of chute 12 including along and generally parallel to second wall 48. A second segment 62 can extend from an intersection with first segment 60 in a direction toward first wall 16, and can be positioned such that it is spaced apart between third wall 52 and fourth wall 54. Respective third 64 and fourth 66 segments can extend from an intersection with second segment 62 at an end thereof opposite the intersection with first segment 60, and respective directions toward third wall 52 and fourth wall 54. Third segment 64 and fourth segment 66 can further extend in a direction toward first wall 16 as they extend outwardly from third segment 64 respectively toward third wall 52 an fourth wall 54. Further, third segment 64 and fourth segment 66 can extend substantially to the location of perimeter 14 of chute 12.

As such, the various segments of tear seam 20 can divide cover 18 into a plurality of individual sections 68, 70, and 72 that can be at least partially separated from one another and further at least partially separated from adjacent portions of chute 12 so as to be moveable to accommodate deployment of air bag 28. As further shown in FIG. 3, first section 68 is disposed toward forward edge 46 of instrument panel 30 and is configured to be joined, and remained joined, with chute 12 in the area along first wall 16. In the example shown, third segment 64 and fourth segment 66 of tear seam 20, as mentioned above, extend to locations adjacent third wall 52 and fourth wall 54, respectively, such that at such locations they are remote from first wall 16. As such, portions of first sections 68 are also joined with, and remained joined with, portions of third wall 52 and fourth wall 54. Similarly, second section 70 is disposed toward the rearward side 50 of instrument panel 30 and is further configured to be disposed toward driver side of vehicle 32. In this arrangement, third segment 64 of tear seam 20 along with second segment 62 and a portion of first segment 60 surround second section 70 such that, upon deployment of air bag 28, second section 70 is separated from first section 68 and third section 72 thereaong, while remaining joined with chute 12 along a portion of the third wall 52. Similarly, third section 72 is surrounded by fourth segment 66 of tear seam 20, as well as second segment 62 and a remaining portion of first segment 60. In this arrangement, third section 72 is divided so as to become separated from first section 68 and second section 70 therealong during air bag 28 deployment, while remaining joined with chute 12 along fourth wall 54. Further, both second section 70 and third section 72 are separated from chute 12 along second wall 48.

As further shown in FIG. 3, second segment 62 of tear seam 20 may be positioned closer to fourth wall 54 than third wall 52. In an example, second segment 62 may be positioned to be located within between about 33% and 49% of the total distance from fourth wall 54 to third wall 52, and in one embodiment between about 40% and 49%. Such positioning of second seam segment 62 can result in third section 72 of cover 18 having an area that is smaller than an area of second section 70. Further, such location of second segment 62, combined with the orientation of third segment 64 and fourth segment 66 in which third segment 64 and fourth segment 66 extend in a direction toward first wall 16 as they extend outwardly respectively toward third wall 52 and fourth wall 54, can result in first section 68 having a offset-chevron shape that is disposed toward fourth wall 54.

Figure 6:
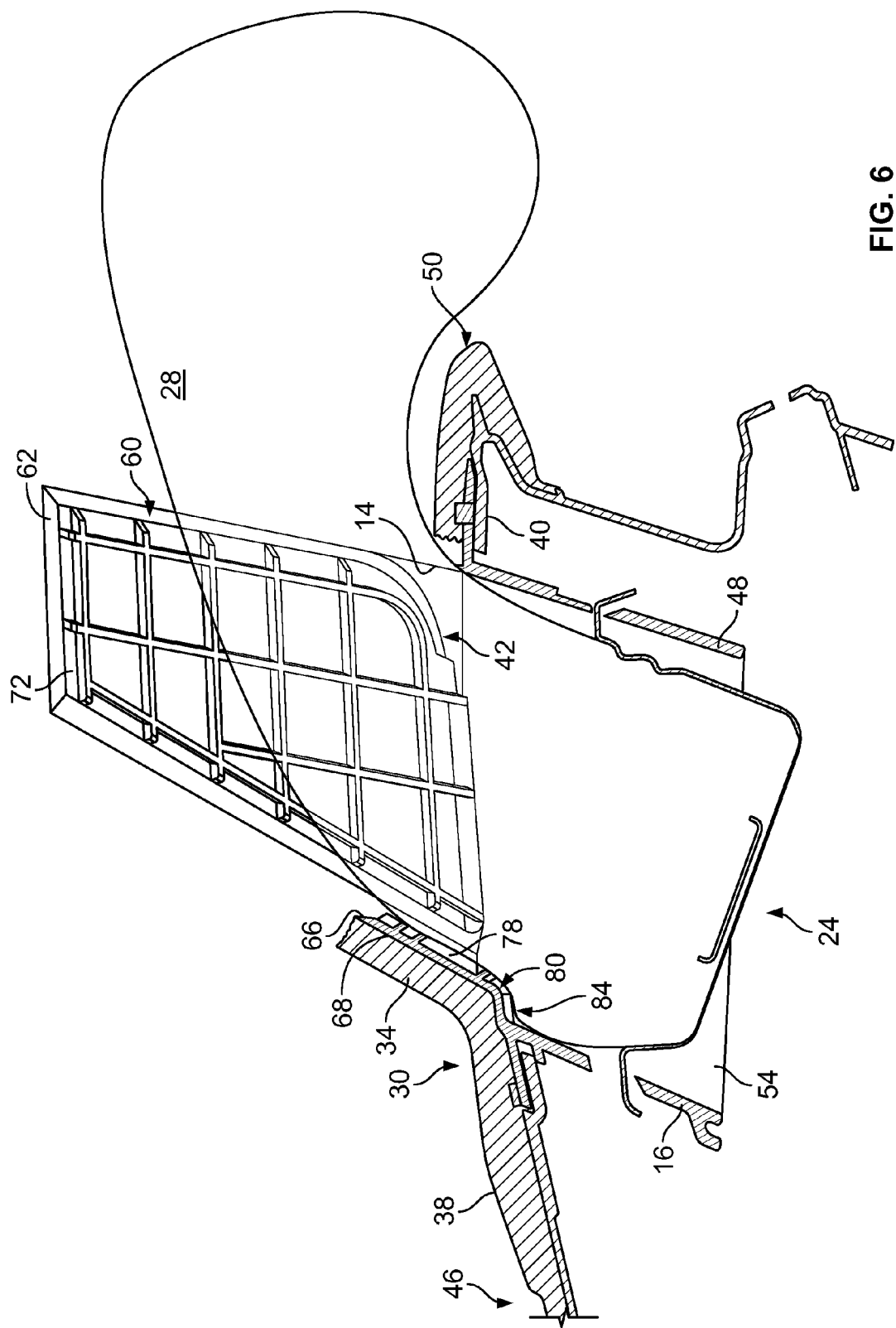
FIG. 6 is the cross-sectional view of the instrument panel of FIG. 1 during a state of the air bag assembly that includes deployment of an air bag from out of the housing.

As shown in FIG. 6, the above-described division of cover 18 by the various segments of tear seam 20 facilitate the opening of housing 10 upon deployment of air bag 28. In general, deployment of air bag 28 initially results in air bag 28 filing the interior 26 of chute 12 and applying a pressure against cover 18. Such pressure causes rupture of tear seam 20, including along first, second, third, and fourth segments 60, 62, 64, and 66 thereof. Although, as described above, tear seam 20 is initially only a weakened area within housing 10 such that cover 18, including the various sections 68, 70, and 72 thereof remain integral with each other and with chute 12, upon the rupture of tear seam 20 the various sections 68, 70, and 72 of cover 18 become decoupled from each other and from various portions of chute 12, as discussed above (i.e. the portions without a portion of seam 20 disposed therebetween). As further discussed above, upon air bag deployment first section 68 of cover 18 remains joined with chute 12 along first wall 16 and along portions of third wall 52 and fourth wall 54 disposed forward of third tear seam segment 64 and fourth tear seam segment 66. Similarly, second section 70 and third section 72 of cover 18 remain respectively joined with third wall 52 and fourth wall 54. Accordingly, cover 18 is configured such that the various sections 68, 70, and 72 of cover 18 deflect at least partially away from chute 12, so as to allow air bag 28 to deploy from out of opening 42 and toward a passenger of vehicle 32. Such deflection of first section 68 and second section 70 is shown in the example of FIG. 6 in which section 68 and 70 deflect upwardly by flexing along portions thereof disposed toward first wall 16 and fourth wall 54, respectively. Although not shown in FIG. 6, the deflection of second section 70 can be similar to that of third segment 64, as illustrated.

To accommodate the above-described deformation of cover 18, including of the individual sections 68, 70, and 72 of cover 18, housing 10 can be made of a somewhat flexible material, such as a polymeric material, for example DEXFLEX™ or other material that exhibits a level of ductility at cold temperatures (at least to −30° C.) and acceptable toughness at high temperatures (at least to 90° C.). Other material such as TPO (thermoplastic olefin), TPE (thermoplastic elastomer) or TEO (thermoplastic elastomer olefin) may also be used. In addition, the presence of hinge area 22 within cover 18 can provide for increased deformability of a portion of cover 18. As mentioned above, hinge area 22 extends between opposite portions of upper perimeter 14 of chute 12 and is disposed between the first wall 16 and the tear seam 20 and can be generally parallel to first wall 16. In the particular example illustrated in FIG. 5, hinge area 22 extends between a portion of upper perimeter 14 disposed along an intersection of cover 18 with third wall 52 and an opposite portion of upper perimeter 14 disposed along an intersection along cover 18 with fourth wall 54. Further, hinge area 22 is positioned between first wall 16 and third tear seam segment 64 and fourth tear seam segment 66 so as to be positioned within first section 68 of cover 18. In particular, hinge area 22 can extend from third wall 52 at an intersection thereof with a corresponding end of third tear seam segment 64 to fourth wall 54 at an intersection thereof with a corresponding end of fourth tear seam segment 66.

Hinge area 22 can be defined by a portion of cover 18 that exhibits a reduction in material thickness along at least a portion thereof. Such reduction of material thickness can be of a sufficient quantity and over a sufficient width of hinge area 22 in a direction opposite the extension thereof between third wall 52 and fourth wall 54 such that cover 18 is generally more flexible within hinge area 22 than within adjacent portions within cover 18. As such, the portion of cover 18 through which hinge area 22 extends, for example first section 68, can undergo deformation during air bag 28 deployment mostly or entirely within hinge area 22. Such a reduction in material thickness can be achieved, for example by the formation of a channel or trench within hinge area 22, or, as shown in FIG. 3, as a plurality of gaps 80 generally aligned with each other along the direction of extension of hinge area 22 from a respective ones of a plurality of support ribs 78 integrally formed with cover 18. As shown in the Figures, such support ribs 78 are integrally formed with cover 18 and are disposed toward interior 26 of housing 10. Such support ribs 78 provide for increased rigidity of cover 18 and, accordingly increased support for portions of instrument panel 30 disposed thereover. By providing the aligned gaps 80 in ribs 78, as shown in FIG. 3, cover 18, and in particular first section 68 thereof, is made more flexible along hinge area 22, particularly in a direction perpendicular to the direction of extension thereof.

The positioning of hinge area 22 in a location disposed away from first wall 16 results in a portion of first section 68 immediately adjacent first wall 16 and extending away therefrom toward hinge area 22 that experiences little or no deformation or other movement thereof during deployment of air bag 28. The rigidity of such a deflection area 84 is augmented by the fact that such an area 84 is within portions of first section 68 that are not only integrally joined with first wall 16, but also portions of third wall 52 and fourth wall 54. As shown in FIG. 1, deflection area 84 overlies a portion of air bag module 24 in the initial state of housing 10 and air bag 28 by a distance 82 that, in an embodiment, can be between 5 mm and 40 mm, and in a more particular embodiment, between 20 mm and 30 mm. Upon deployment of air bag 28, as depicted in FIG. 6, deflection area 84 can direct the deploying air bag 28 in a direction away from first wall 16. Such an arrangement can be particularly useful when an assembly of air bag housing 10 and air bag module 24 is used in connection with an instrument panel 30, as shown in FIG. 2, that angles upwardly along angle 88, which, as depicted is zero degrees or greater, or up to about 5 degrees from forward edge 46 of instrument panel 30 to rearward edge 50 thereof. In such an arrangement, some deflection of air bag 28 as it deploys can be useful to maintain air bag 28 in a position that is disposed toward an occupant of vehicle 32.

The above-described offset location of second tear seam segment 62 can also serve to manipulate the path of deploying air bag 28 in a lateral direction within vehicle 32. As mentioned above, the offset-chevron shape of first section 68 of cover 18 can help direct air bag 28 in a direct path having a component in a direction 90, which as illustrated in FIG. 2, is in a direction away from the passenger side of vehicle 32 and toward the driver side thereof. Such deflection of air bag 28 can help to maintain portions thereof away from windshield 86, which as shown in FIG. 2, may curve or taper rearwardly from the center of vehicle 32 toward the passenger side thereof, such that windshield 86 may be closer to instrument panel 30 and, accordingly, portions of a deploying air bag 28, toward the adjacent outboard portion of vehicle 32 and/or instrument panel 30. In the arrangement of instrument panel 30 described herein, wherein instrument panel 30 is generally horizontal, or angled upwardly from front edge 46 toward rearward edge 50 thereof such further deflection may be particularly useful as the initial, natural deployment direction of air bag 28 may be toward windshield 86.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

We claim:

1. An air bag housing, comprising:
   a chute defining an upper perimeter with a first wall extending from the upper perimeter; and
   a cover extending over the chute integrally from the upper perimeter and defining:
      a tear seam extending between opposite portions of the upper perimeter remote from the first wall;
      a rigid area contacting the first wall;
      a plurality of support ribs extending away from the first wall at least within the rigid portion;
      a hinge area defined by a reduced material thickness comprising respective gaps in the support ribs generally aligned along the hinge area along at least a portion of the cover, the hinge area being disposed toward an interior of the chute, contacting the rigid area, and extending between the opposite portions of the upper perimeter.

2. The air bag housing of claim 1, wherein the tear seam is a weakened area of the housing.

3. The air bag housing of claim 1, wherein:
   the chute further has a second wall opposite the first wall and third and fourth walls extending on opposite sides of the chute between the first and second walls; and
   the tear seam includes a first segment, and the opposite portions of the upper perimeter are disposed along the third and fourth walls, the first tear seam segment extending generally parallel to the second wall.

4. The air bag housing of claim 3, wherein the tear seam further includes second, third, and fourth segments, the second segment extending from a location along the first segment toward the first wall and the third and fourth segments extending from an end of the second segment respectively toward the third and fourth walls.

5. The air bag housing of claim 1, wherein:
   the chute further has a second wall opposite the first wall and third and fourth walls extending on opposite sides of the chute between the first and second walls;
   the tear seam includes first, second, third, and fourth segments dividing the cover into a first, forward section, and second and third laterally-disposed rearward sections; and
   the third and fourth tear seam segments extend to locations adjacent opposite ends of the hinge area.

6. The air bag housing of claim 5, wherein the first forward section extends integrally from the third and fourth walls in respective locations between the first wall and the hinge area.

7. The air bag housing of claim 1, wherein the hinge area extends generally parallel to the first wall and is disposed between about 10 mm and 40 mm therefrom.

8. A vehicle instrument panel, comprising:
   a substrate extending along a plane and defining an interior, an exterior, a forward edge and a rearward edge, the substrate angling upward from the forward edge to the rearward edge;
   an air bag housing, including:
      a chute defining an upper perimeter with a first wall extending therefrom; and
      a cover extending between the interior of the substrate and the upper perimeter of the chute and defining a hinge area extending between opposite portions of the upper perimeter and disposed away from the first wall with a rigid portion extending from the first wall to the hinge area, a deflection portion of the cover is defined between the first wall of the chute and the hinge area; and
   an air bag module coupled within the chute;
   wherein the deflection portion extends from the first wall of the chute at a distance so as to overlie a portion of the air bag module.

9. The vehicle instrument panel of claim 8, wherein:
   the air bag module includes an air bag deployable therefrom; and
   the cover further defines a tear seam extending between opposite portions of the upper perimeter opposite the hinge area from the first wall, the tear seam being at least partially rupturable by pressure applied by the air bag upon deployment thereof against a surface of the cover.

10. The vehicle instrument panel of claim 9, wherein the hinge area is flexible such that, upon deployment of the air bag, the cover is moveable away from at least a portion of the chute by flexing of the cover within the hinge area.

11. The vehicle instrument panel of claim 9, wherein:
the substrate defines a forward edge and a rearward edge, the forward edge tapering in a rearward direction from a location toward a center of the instrument panel toward a passenger side thereof;
the tear seam includes first, second, third, and fourth segments dividing the cover into a first forward section, and second and third laterally-disposed rearward sections, wherein the third lateral rearward section is disposed toward the passenger side of the substrate relative to the second lateral rearward section and has an area smaller than an area of the second lateral rearward section.

12. The vehicle instrument panel of claim 1, wherein the third and fourth tear seam segments extend to locations adjacent opposite ends of the hinge area.

13. An air bag housing, comprising:
a chute defining an interior; and
a cover extending integrally with the chute over the interior and defining:
a tear seam including first, second, third, and fourth segments dividing the cover into a first forward section, and second and third laterally-disposed rearward sections, the third section having an area smaller than an area of the second section; and
a hinge area extending through the first section.

14. The air bag housing of claim 13, wherein an upper perimeter of the chute is defined along an intersection thereof with the cover, the hinge area being spaced apart from the upper perimeter by between about 10 mm and 40 mm.

15. The air bag housing of claim 14, wherein the third and fourth tear seam segments extend to locations adjacent opposite ends of the hinge area.

16. The air bag housing of claim 13, wherein the hinge area is defined by a reduced material thickness along at least a portion of the cover.

* * * * *